June 7, 1966 D. W. MOLD 3,254,782
REFUSE VEHICLE PACKER
Filed Oct. 14, 1964 6 Sheets-Sheet 1

FIG.1

INVENTOR.
DONALD W. MOLD
BY
ATTORNEYS

June 7, 1966   D. W. MOLD   3,254,782
REFUSE VEHICLE PACKER
Filed Oct. 14, 1964   6 Sheets-Sheet 2

INVENTOR.
DONALD W. MOLD
BY
ATTORNEYS

June 7, 1966  D. W. MOLD  3,254,782
REFUSE VEHICLE PACKER
Filed Oct. 14, 1964  6 Sheets-Sheet 3

INVENTOR.
DONALD W. MOLD
BY
ATTORNEYS

June 7, 1966 D. W. MOLD 3,254,782
REFUSE VEHICLE PACKER
Filed Oct. 14, 1964 6 Sheets-Sheet 4

INVENTOR.
DONALD W. MOLD
BY
ATTORNEYS

INVENTOR.
DONALD W. MOLD
BY
ATTORNEYS

June 7, 1966  D. W. MOLD  3,254,782
REFUSE VEHICLE PACKER
Filed Oct. 14, 1964  6 Sheets-Sheet 6

INVENTOR.
DONALD W. MOLD
BY
ATTORNEYS

United States Patent Office 3,254,782
Patented June 7, 1966

3,254,782
REFUSE VEHICLE PACKER
Donald W. Mold, Whitehouse, Ohio, assignor to Paul Hardeman, Inc., a corporation of Michigan
Filed Oct. 14, 1964, Ser. No. 403,948
15 Claims. (Cl. 214—519)

This invention relates to improvements in refuse vehicles and, more particular to mechanisms for loading the vehicle body with compressed refuse.

There are many types of loading mechanisms for compressing trash as it is gathered and loaded into a refuse vehicle body so that, when loaded, a vehicle can carry a greater weight of trash to the place of disposal, such as an incinerator, dump, land fill, or the like. The vehicles and crews required for handling a given tonnage of refuse are thereby utilized far more effectively and the total cost of collecting and disposing of the trash and refuse in a city is greatly reduced.

Of the various types of mechanisms for loading and packing collected trash, those which compress or "prepack" the trash as it is delivered into the vehicle body are far more efficient than those which intermittently pack successive loads of uncompressed trash into a closed vehicle body and gradually compress the entire volume of trash in the body as successive loads are rammed into it. Although both types require intermittent actuation of the compressing mechanism, the "pre-pack" type permits the use of relatively lighter and faster-acting mechanisms which can develop extremely high compression on small unit loads and, thereby, crush sturdy boxes and crates, for example, which would resist crushing after delivery into the vehicle body. A particular but less apparent advantage of the "pre-pack" type of loader, such as disclosed, for example, in the United States Patent No. 2,888,158 to Wood, is that, although it actually compresses and delivers loads intermittently into the vehicle body it provides a tail gate arrangement which is usually always ready to receive uncompressed trash and, thus, the loading crew need not wait while a prior load is being compressed and delivered into the vehicle before a new load can be placed in the loading mechanism.

An object and advantage of the present invention is to provide an improved power and cycling system for operating a pre-pack type of loader as described above. An advantage of this invention is that it automatically recycles the crushing and delivery mechanisms and no attendant or crew member is required to initiate the cycle when the tail gate has been loaded with a volume of trash to be compressed and delivered into the vehicle body.

A particular advantage of this invention is that it provides a sequential system which does not operate on a fixed timed cycle. Instead the system is self-timed to operate as a given load is pre-packed to either the designed minimum volume or maximum pressure, whichever occurs sooner. As a consequence, the over-all rate at which a loader and packer of a given size can handle a given volume of refuse is greatly increased and, accordingly, the operating efficiency of the vehicle and its crew is greatly increased.

Another and further object and advantage of this invention is that the timing of the cycling according to the imposition of the desired maximum operating pressure on a given load, if it is not compressed to the designed minimum volume, also serves as an automatic over-load release on the operating mechanism, thereby minimizing jamming and break-downs. Conversely, this feature permits the equipment to be designed, for a given size, to impose higher compression loads while operating faster and, thereby, provide a higher rate of loading and packing.

Other objects and advantages of this invention, including the improved design of the elements of the mechanism, will be apparent from the following specification, including the appended claims, and the accompanying drawings in which:

Figure 1:
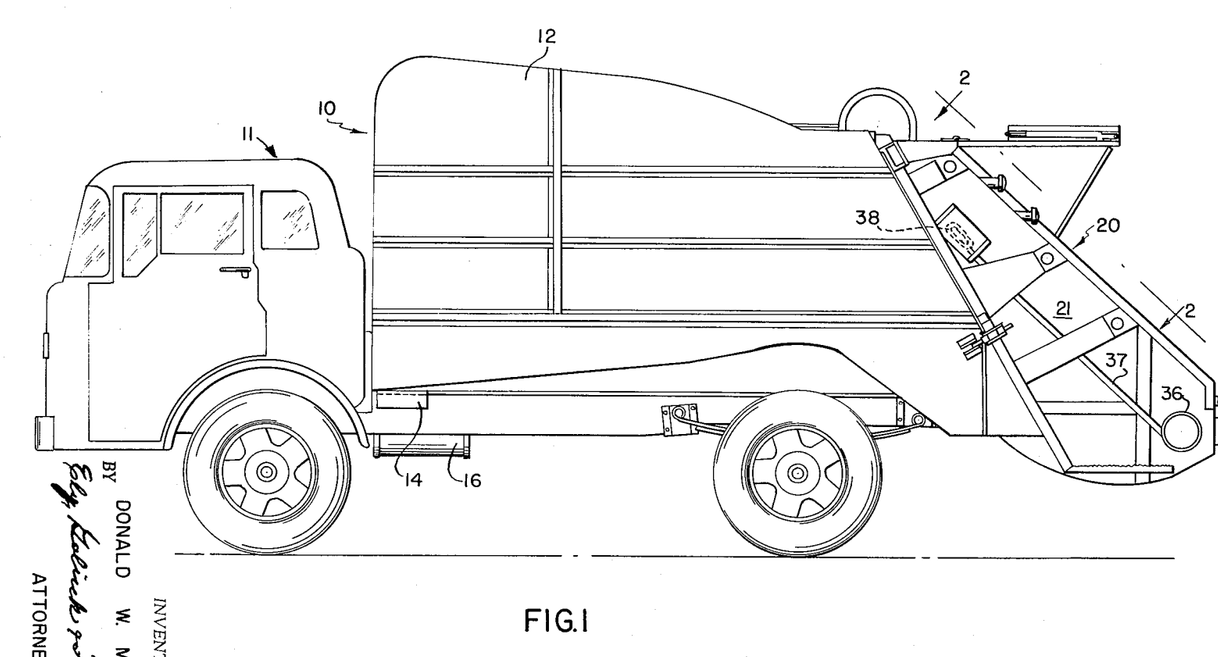
FIG. 1 is a side elevation of a refuse vehicle equipped with a loader made according to this invention.

As shown in FIG. 1, the refuse vehicle 10 comprises a suitable truck or lorry 11 on the chassis of which is mounted a body 12, usually fully enclosed, into which refuse is loaded. Any suitable means for emptying a body 12 may be employed. The particular body shown is pivotally mounted on a chassis bracket 13 (shown fragmentarily in FIG. 4A) for dumping by means of an enclosed hydraulic hoist, the base 14 of which is shown in FIG. 1 at the forward end of the body 12. The rear of the body 12 is normally closed by a tail gate structure 20 carrying the operating mechanism of a packing loader made according to this invention. The tail gate structure is pivotally mounted at the upper rear portion of the body 12 and is raised by suitable hydraulic cylinders (not shown) acting through connecting rods and brackets, shown as 15 in FIG. 4A, to lift the tail gate 20 so that packed refuse may be dumped out of the rear of the body 12 when the body 12 is, in turn, raised and pivoted on the pivot 13. All hydraulic cylinders, including the cylinders for the operating mechanism carried in the tail gate 20 are operated through control valves and hydraulic lines (not shown) by a high-pressure pump (not shown) carried on the chassis of the truck 11 and driven, through a suitable power take-off, by the motor of the truck. The general location of the pump which provides the high pressure source for the cylinders in the hereinafter described operating mechanism and its associated system is indicated in FIG. 1 by the pump's associated sump tank 16, to which low pressure hydraulic fluid from the several cylinders are returned by appropriate lines.

Figure 4A:
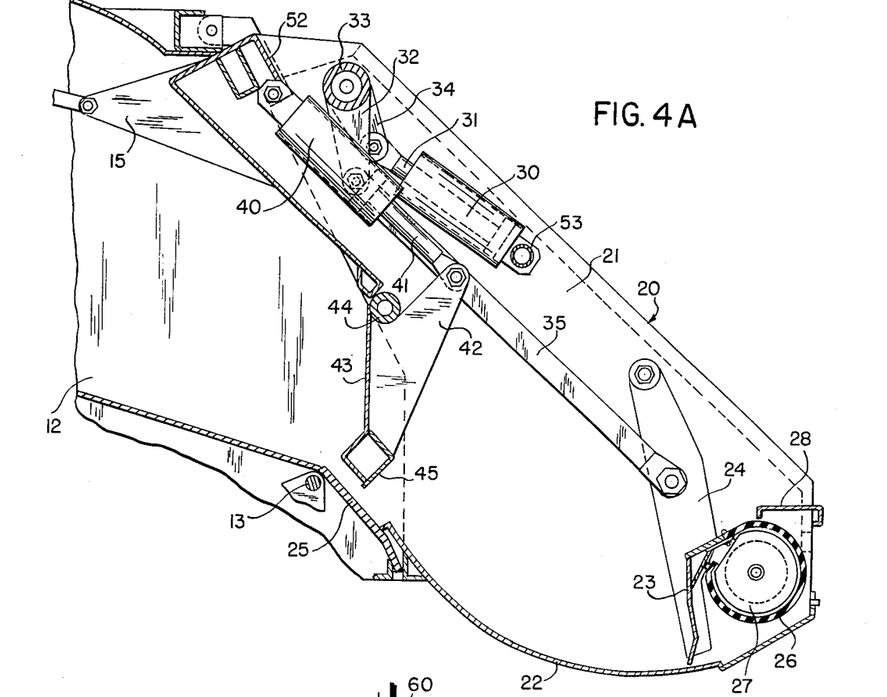
FIG. 4A is a broken-away section, taken along the line 4—4 of FIG. 2, in which several mechanical details of construction are shown fragmentarily and others, such as hydraulic lines, fittings, valves, and the like, are eliminated for clarity of illustration.

The tail gate structure 20, as shown in FIGS. 2, 4A, 5A, 6A and 7A, comprises side members 21 supporting a rearwardly-extending sump bottom 22 into which trash is dumped when the delivery panel 23 is in its retracted position as shown in FIG. 4A. The delivery panel 23 is swung on a pair of arms 24, each pivotally carried on a side member 21. The delivery panel 23 is swung forward to sweep trash loaded onto the bottom 22 to a crusher sill 25 located at the rear opening of the body 12.

The power to so actuate the delivery panel is provided by a pair of hydraulic actuating cylinders 30, each located at a side of the tail gate structure 20. The rod 31 of each cylinder 30 is connected to a pair of bell crank arms 32 fixed to tubular crank shaft 33. The shaft 33 carries, adjacent each pair of arms 31, a pair of bell-crank arms 34 which, in turn, are each connected to a panel delivery arm 24 by means of a connecting rod 35.

Figure 6A:
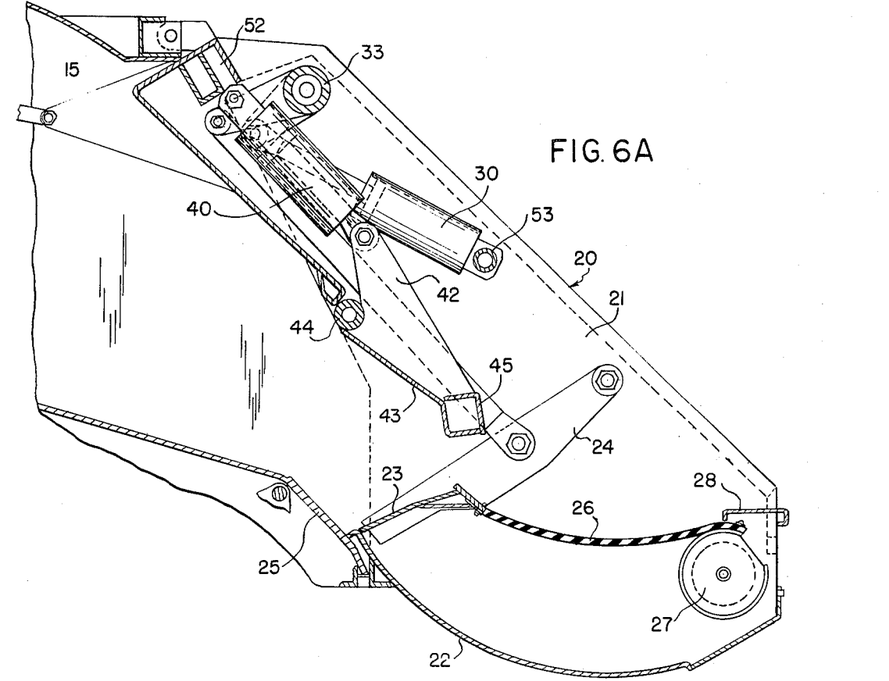
FIG. 6A is a view similar to FIG. 5A showing the succeeding phase in a four-phase cycle of operation.
Figure 7A:
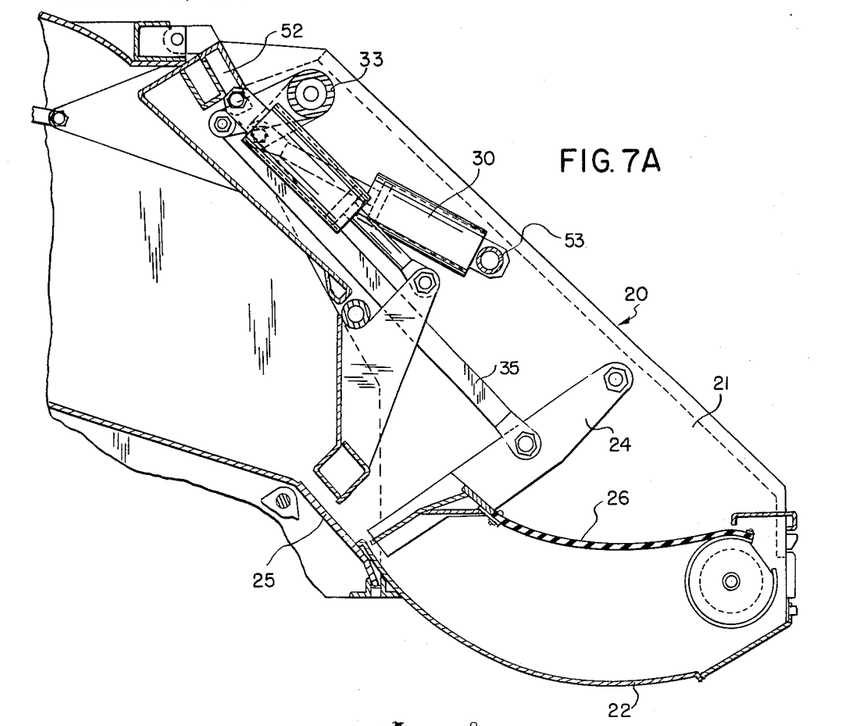
FIG. 7A is a view similar to FIG. 6A, showing a phase subsequent to the phase of FIG. 6A and preceding the phase of FIG. 4A in a four-phase cycle of operation.

When the delivery panel 23 is swung to its forward position, as shown in FIG. 6A and 7A, it carries with it a flexible false bottom 26 which, thereby, extends over the sump bottom 22 to prevent new trash, which may be dumped into the tail gate structure while a prior load is delivered to the crusher sill, from falling behind the panel 23. The false bottom 26 in advancing with the delivery panel 23, unwraps from a drum 27 located under the delivery sill 28. When the false bottom 26 is re-wrapped onto the drum 27 when the panel 23 is retracted to its position shown in FIG. 4A from its advance position shown in FIG. 7A, the raised forward edge of the sill 28 will push into the sump bottom 22 any trash which does not fall into the sump bottom of its own accord as the false bottom is retracted. Some dirt and small bits of trash will inevitably fall under the false bottom 26 behind the panel 23 and tend to accumulate under the drum 27. To prevent such accumulated dirt from interfering with the action of the drum 27 and false bottom 26, a clean-out panel 29, hinged beneath the sill 28, is provided for removal of such accumulations from time to time.

Any suitable means may be employed for causing the drum 27 to re-wrap the false bottom 26, such as an internal spring wound by the wrapping of the false bottom. Preferably, however, means for positively re-winding the drum is preferred; in this particular embodiment the left-hand end of the drum 27 (as viewed in FIG. 2) carries a reel in an external housing 36. A flexible cable (not shown) runs from the reel in the housing 36 through a tube 37 and around an angled sheave 38, from which the cable runs inside the side member 11 to a spring take-up coupling 39 connecting the cable to the right hand delivery panel arm 24. By winding the cable on the enclosed reel with a wrap opposite to the wrap of the false bottom 26 on the drum 27, the powered retraction of the arm 24 positively powers the re-wrap of the bottom 26 into the drum 27, the spring take-up coupling 39 allowing for the slight linear difference between the swung positions of the arm 24 and the circumferential wrap of the false bottom 26 on the drum 27.

"Pre-packing" of the trash delivered to the crusher sill 25 by the panel 23 is accomplished by a crusher cylinder 40 pivotally mounted to the upper framework of the tail gate structure 20. The crusher cylinder rod 41 is directly pivotally connected to a pair of bell crank arms 42 welded to and extending rearwardly and perpendicular to a crusher plate 43 carried by a tubular crusher plate 43. The lower edge of the crusher plate 43 is formed and reinforced with a length of angle iron to provide a crusher bar 45. Thus, when the crusher bar 45 is forced from its raised position (as shown in FIG. 6A) all the way to its fully lowered position (shown in FIG. 4A), any trash caught between the bar 45 and the crusher sill 25 will be compressed, i.e., "pre-packed," to the designed clearance between the bar and sill.

Figure 2:
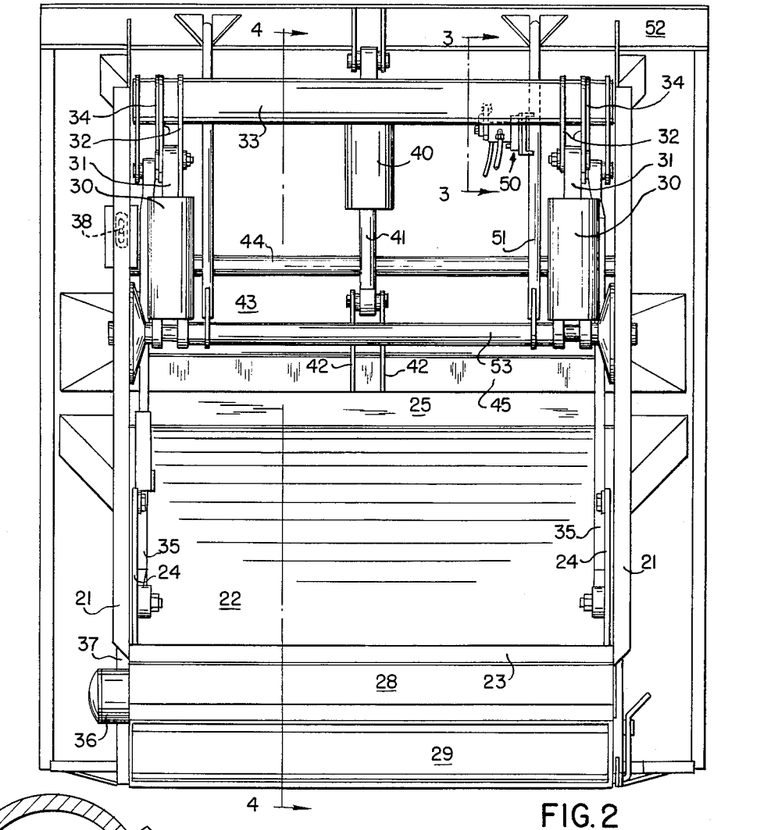
FIG. 2 is a view taken along the lines 2—2 of FIG. 1 with the tail gate cover (shown in FIG. 1 in its normal raised position during loading) removed.
Figure 3:
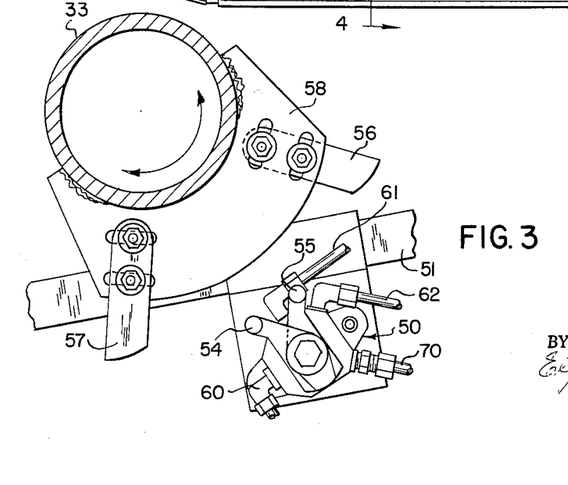
FIG. 3 is an enlarged detail, taken along the lines 3—3 of FIG. 2, showing the pilot valve and its associated tripping mechanism.

The only mechanical inter-connection needed between the delivery and crushing mechanism described above and the hydraulic system operating the cylinders 30 and 40 is provided by the means for operating a pilot trip valve 50 in the hydraulic system. The pilot valve 50 (omitted in FIGS. 4A, 5A, 6A, and 7A for clarity of illustration of the linkages operated by the cylinders 30 and 40) is mounted on any convenient portion of the framework of the tail gate structure 20 so that it may be actuated by the stroke of the cylinders 30. In this particular embodiment the valve 50 is, as shown in FIG. 2, mounted adjacent the shaft 33 on a rod 51 extending between a transverse frame member 52 of the tail gate structure 20 and the transverse staff 50 upon which the cylinders 30 are pivotally supported. As shown in detail in FIG. 3, in which the crankshaft 33 is shown oscillated midway between its terminal positions, the valve 50 is provided with a pair of axially spaced interconnected trip dogs 54 and 55 contacted, respectively, by the axially spaced over-riding radial camming fingers 56 and 57 angularly adjustably mounted, for precise operations, on the rocker cam plate 58 welded to the shaft 33. Thus, when the shaft 33 is oscillated to its terminal counter-clockwise position by full retraction of the pistons in the cylinders 30, the finger 57 will, in the course of over-riding, trip the dog 55 to push it down to connect a tap to the high pressure line 60 to the pilot line 61 and open the pilot line 62 to the exhaust return line 70. Similarly, when the shaft 33 is oscillated to its terminal clockwise position by full extension of the pistons in the cylinders 30, the finger 56 will trip the dog 54 to connect the high pressure line 60 to the pilot line 62 and open the pilot line 61 to the exhaust return line 70.

OPERATION

As indicated above, the operation of the above-described loading and packing mechanism is commenced whenever, with the motor of the truck running, a crew member activates the conventional power take-off to drive the hydraulic fluid pump and operates a manual on-and-off master valve to direct such high pressure fluid to the hydraulic system for that mechanism. As also indicated in the statements of the objects of this invention, the mechanism will thereafter operate continuously in repetitive cycles and without further attention until a crew member stops the motor, disengages the power take-off, or switches off the master valve for the packing and loading mechanism. As still further indicated, the above-described delivery and crushing mechanism may be operated by a four-phase cycle or a three-phase cycle, depending upon the interconnection of the elements in the hydraulic system. The three-phase cycle is generally preferred because it reduces the average total cycle time in the order of 15%, thereby permitting faster collection of a full load of packed trash and, thus, the potential efficiency of the vehicle. However, since the three-phase cycle essentially combines the simultaneous operation of the first two phases of a four-phase cycle, the latter is shown in FIGS. 4(A and B) to 7(A and B) and will be first described for convenience of illustration:

Four-phase cycle—first phase

FIGS. 4A and B illustrate, as an initial point in a four-phase cycle, the position of the above-described loading and packing mechanism when the crusher bar 45 has been forced to its lowest position by the full extension of the piston in the double-acting cylinder 40 and, at the same time, the piston in the double-acting cylinder 30 has been forced to its fullest retracted position, thereby, through the bell-crank arm 32, crankshaft 33, arms 34, and rod 35, forcing the delivery plate 23 to its maximum retracted position. This allows any trash which had been on the false bottom 26 to fall onto the sump bottom 22. In this position the finger 57 on the rocker cam 58 carried by the shaft 33 will have shifted the dog 55 on the pilot valve 50 connecting the tap to the high pressure line 60 to pilot line 61 and opening the pilot line 62 to the exhaust return line 70.

Figure 4B:
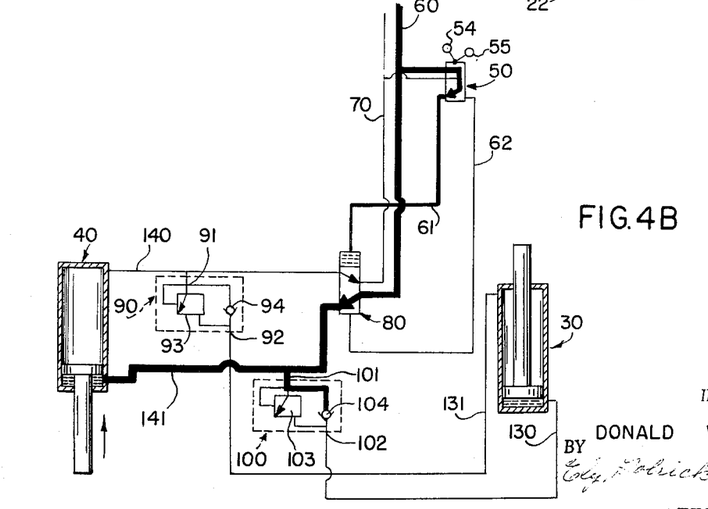
FIG. 4B is a diagrammatic showing of the hydraulic system when the operating mechanism is in the phase shown in FIG. 4A.
Figure 5A:
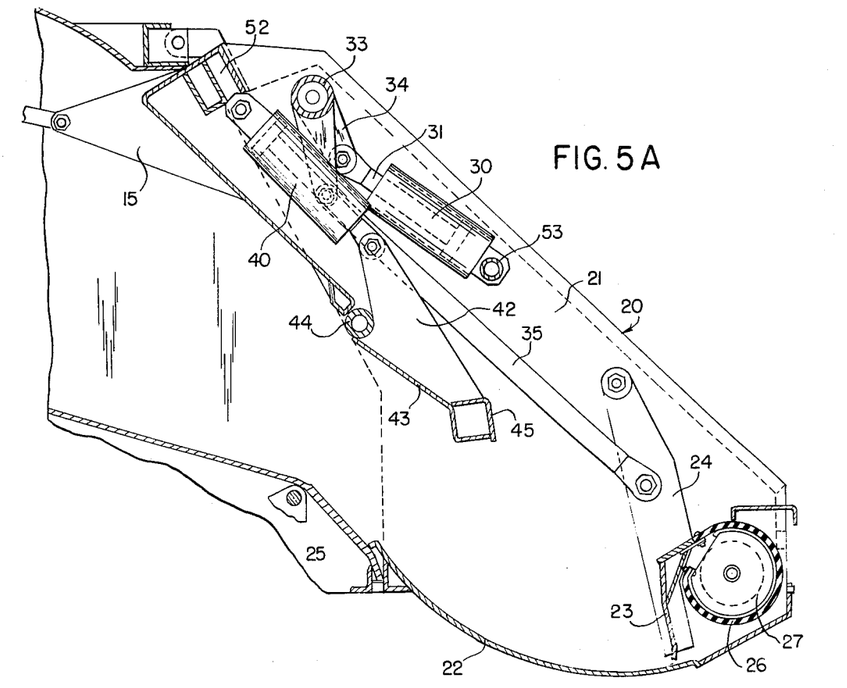
FIG. 5A is a view corresponding to 4A, but showing the operating mechanism in a succeeding phase of a four-phase cycle of operation.
Figure 5B:
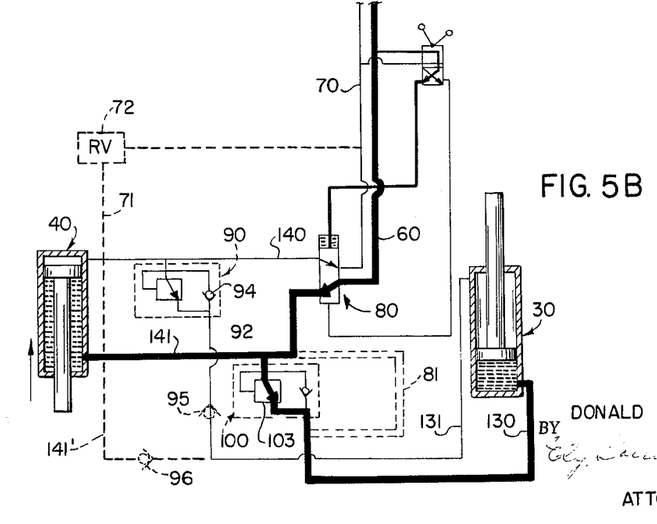
FIG. 5B is a diagrammatic showing similar to FIG. 4B, of the hydraulic system at the phase shown in 5A.
Figure 6B:
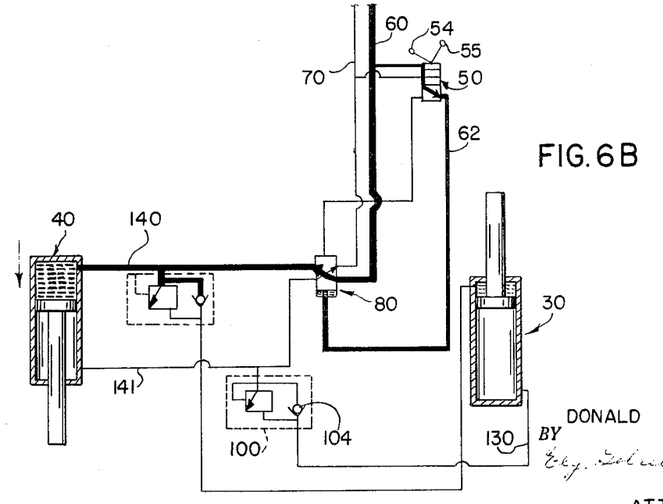
FIG. 6B is a diagrammatic showing similar to FIGS. 4B and 5B, but showing the hydraulic system at the phase shown in FIG. 6A.
Figure 7B:
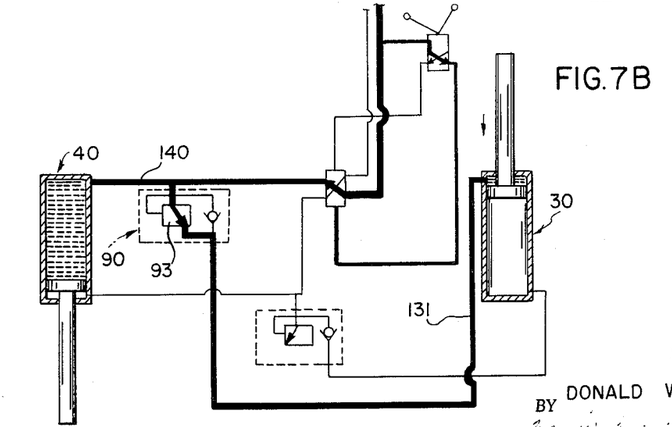
FIG. 7B is a diagrammatic showing similar to FIGS. 4B, 5B, and 6B but showing the hydraulic system at the phase shown in FIG. 7A.

Referring to FIG. 4B, in which, as in the succeeding diagrams FIGS. 5B, 6B, and 7B, heavy lines represent those lines carrying high-pressure fluid and light lines represent those carrying only the pressure of the exhaust return, pressure in the line 61 actuates the main control valve 80 to connect the high-pressure line 60 to the line 141 of the piston rod end of the cylinder 40 and the line 140 of the piston face end of the cylinder 40 is simultaneously connected through the control valve 80 to the exhaust line 70.

Tapped into the line 140 at its tap 91 is a sequence valve 90 having an opposite tap 92. The tap 91 is connected to the tap 92 through a normally-closed valve 93 which opens in response to pressures in excess of a minimum to which the valve is set; the tap 91 is also connected to the tap 92 by a by-pass of the valve 93 through a check valve 94 which is closed when the pressure at the tap 91 exceeds the pressure at tap 92 and opened under a reversal of pressures at the tap. Tapped into the line 141 by its tap 101 is a similar sequence valve 100 having its tap 102 connected to the tap 101 through the parallel normally closed pressure responsive valve 103 and by-pass check valve 104.

The piston rod ends of the cylinders 30 are connected together and thence by a common line 131 to the sequence valve 90 so that, for purposes of the diagrammatic illustration in FIG. 4B and succeeding corresponding diagrammatic showings of the hydraulic system in FIGS. 5B, 6B, and 7B, it is sufficient to show one cylinder 30 connected by the line 131 through the sequence valve 90 to the line 141. Similarly, both piston-face ends of the cylinders 30, though only one is shown in the diagrams, are connected together by a common line 130 leading to the tap 102 of the sequence valve 100 and thence to the line 141. Thus, with the mechanism in the positions shown in FIG. 4A and the hydraulic system in the condition shown in FIG. 4B, high-pressure fluid runs from the line 60 through the control valve 80 and line 141 to the rod end of the cylinder 40, commencing, thereby, to raise the crusher bar 45 while exhausting fluid from the piston face end of the cylinder 40 through the line 140, control valve 80 to the exhaust line 70. The pressure required to raise the piston on the cylinder 40 being less than that for which the pressure-responsive valve 103 is set, the sequence valve 100 remains closed. The rod end of the cylinder 30 had been subjected to a high-pressure in the preceding phase and any excess pressure in the line 131 (and consequently at the piston face end of the cylinder 30 and its line 130) to that of the line 140 is relieved by back-bleeding through the check valve 94. Sufficient pressure is maintained in the return line 70 to hold any piston in its position in its cylinder and, thus, its associated mechanisms when the low pressure on both sides of a piston is balanced by back-bleeding.

*Four-phase cycle—second phase*

When the crusher bar 45 is fully raised at the end of the first phase, and commencement of the second phase, as shown in FIG. 5A, some of the trash "pre-packed" between the bar 45 and sill 25 may fall back onto the trash which will have been loaded onto the sump bottom 22 ahead of the retracted delivery plate 23, through the lip of the bottom 22 resting on the sill 25, together with catch provided by the forward face of the bar 45 and the accumulated trash in the sump restrains any substantial reverse flow of trash loaded over the sill 25.

The effect of the ending of the first phase and commencement of the second phase upon the hydraulic system is shown in FIG. 5B. The pressure drop effected in the line 141 by the retraction of the piston in the cylinder 40 ends when the piston is fully retracted; the pressure-responsive valve 103 in the sequence valve 100 is thereby subjected to the full line pressure of the line 60 and is, thus, opened to the line 130 to commence extending the piston on the cylinder 30 and forcing fluid in the rod end of that cylinder to bleed through the line 131 and check valve 94 of the sequence valve 90 to the line 140 and thence through the control valve 80 to the return line 70.

The extension of the rod of the cylinder 30, through its connecting linkage, advances the delivery panel 23, sweeping trash on the sump bottom 22 up to the crusher sill 25 and such "pre-packed" trash which may be ahead of it will be pushed beyond the sill 25 and into the body 12.

*Four-phase cycle—third phase*

With the crusher bar 45 raised and the delivery panel 23 fully advanced at the end of the second phase and commencement of the third phase, as shown in FIG. 6A, the rocker cam finger 56 carried by the crankshaft 33 will have tripped the dog 54 of the pilot valve 50 to its lowered position, as indicated in FIG. 6B. This action will connect the high-pressure line 60 to the pilot valve line 62, shifting the control valve 80 to connect the high-pressure line 60 to the line 140 of the piston 40 and the line 141 to the exhaust line 70, whereby the piston in the cylinder 40 will commence to extend, expelling fluid at the rod end through the line 141, valve 80, and into the return line 70. Extension of the piston in the cylinder 40 forces the bar 45 down to crush fresh trash delivered to the sill 25. The balancing of the pressure on both sides of the piston in the cylinder 30 by bleeding the line 130 of any excess pressure through the check valve 104 of the sequence valve 100 holds the cylinder 30 in its extended position; thus, the delivery panel 23 is held in its extended position as the bar 45 operates to crush trash ahead of it.

*Four-phase cycle—fourth phase*

Lowering of the bar 45 by high pressure introduced into the piston face end of the cylinder 40 during the third phase, as described above, continues until the piston reaches its limit of travel established by the design of the piston 40 and its linkage, as shown in FIGURE 7B and FIG. 4B, or until the resistance of the trash under the bar 45 reaches the limit of pressure for which the mechanism is designed to apply, whichever limit first occurs. The latter limit will develop when the panel 23 delivers, to the sill 25, relatively or wholly incompressible trash, such as large stones or rubble. In either event, when stoppage of the advancement of the piston in the cylinder 40 causes full line pressure to develop in the line 140, the pressure-responsive valve 93 in the sequence valve 90 opens the line 140 to the line 131 connected to the rod end of the cylinder 30, causing the piston to retract in that cylinder. The delivery panel 23 is also thereby retracted until full retraction causes the rocker cam finger 57 to push down the pilot valve dog 55 and restore the hydraulic system to the condition shown in FIG. 4, whereupon a successive cycle commences.

In the embodiment shown, the pressure to which the sequence valve 90 will respond is usually set so that the bar 45 will crush wooden crates and relatively heavy planks, but action is stopped when the resistance is so great that the safety factor in the design of the mechanism would be exceeded. This not only minimizes jamming and breakdowns, but allows somewhat lighter and less expensive construction, due to the effective overload relief that is obtained. From the point of view of operating efficiency, by shortening the time of the last phase when relatively incompressible trash is being loaded, full loads can be delivered at a faster rate over the sill 25 and into the truck body 12.

*Three-phase cycle*

As started above, a three-phase cycle, obtained by combining, in effect, the first and second phases of the above-described four-phase cycle, is generally preferred because the time of a given cycle may be appricably decreased.

In operating on a three-phase cycle, starting at the initial point shown in FIG. 4A with the crusher bar 45 lowered and the delivered panel 23 retracted, in the first combined phase of the alternate cycle the panel 23 commences to advance simultaneously with the commencement of the raising of the crusher bar 45. The crusher bar 45 reaches its fully raised position relatively rapidly and stops; this occurs when the panel 23 has advanced a portion of its travel and leaves a full opening under the bar 45 through which trash may be pushed onto the sill 25 as the panel 23 completes its travel. At the end of this single dual-operation first-phase, the bar and panel are at the position shown in FIG. 6A, the cam finger 56 has tripped over the pilot valve dog 54, and then proceeds to go through the phase of lowering the crushing bar (the third phase of a four-phase cycle) and the final phase of withdrawing the delivery panel to end one cycle and commence a succeeding cycle.

The modification of the hydraulic system to achieve the above-described three-phase cycle is best shown by the dash-line modification indicated in FIG. 5B. Referring to that figure, the line 141 and the sequence valve 100 are to be recognized as being eliminated and the line 130 is instead, directly connected to the control valve 80 by the line 81, rather than through the sequence valve 100. The rod ends of the cylinders 30 are connected to the tap 92 of the sequence valve 90, through the line 131, as in the four-phase hook-up, but a check valve 95 is inserted ahead of the sequence valve 90 to insure flow only from the sequence valve to the cylinders 30. Between the valve 95 and the rod ends of the cylinders 30 a line 141' connects the line 131, through a check valve 96, to the rod end of the cylinder 40. The rod-end of the cylinder 40 is also connected by a line 71 through a pressure relief valve 72 to the return line 70.

The operation of the hydraulic system as above modified for a three-phase cycle is as follows:

With the pilot valve tripped to direct high pressure from the line 60 through the control valve 80 and thence to the piston face ends of the cylinders 30 through the lines 81 and 130, the extension of the pistons in the cylinders 30 expels fluid from their rod ends into the line 131. The check valve 95 inserted ahead of the sequence valve 90 prevents the back-bleeding of this fluid into the return line 70 through the sequence valve 90 (as in the four-phase cycle) and, instead, forces this normally exhausted fluid into the rod end of the cylinder 40, raising the crusher bar 45. Because fluid in the line 131 is expelled from two cylinders 30 having a greater volume than the one cylinder 40, the piston in the cylinder 40 will be fully retracted before the pistons in the cylinders 30 are fully extended. The "excess" volume of fluid from the rod ends of the cylinders 30 over that required to retract the piston in the cylinder 40 is then discharged to the line 70 through the line 71 and pressure relief valve 72, the latter being set to insure sufficient pressure to raise the bar 45 and retract the panel 23. That is, after the panel 23 has been advanced and the pilot valve dog 54 has been tripped to admit high pressure to the piston face end of the cylinder 40 in the final phase of the cycle, the piston will be advanced and the crusher bar 45 forced down to its limit, the check valve 96 preventing flow from the rod end of the cylinder from acting through the line 131 on the cylinder 30 and prematurely retracting the panel 23 before the crusher bar has reached its limit of travel.

However, when the crusher bar has reached its limit of travel and full line pressure opens the sequence valve to the line 131 through the check valve 95, to commence retraction of the panel 23, thereafter the maximum pressure in the line 131 will be that established by the relief valve 72 until the panel 23 is fully retracted and the dog 55 of the pilot valve is tripped to commence a succeeding cycle.

It is to be understood that this invention is not to be limited to either the specific mechanisms and hydraulic systems disclosed in the above-described embodiments but only by the appended claims. For example, the rod end piston of the specific cylinder may be reversed, with appropriate rearrangements of the hydraulic lines and valves to effect the cyclic operation of the delivery and crushing means. Also, since the force to retract both the crushing and delivery means is substantially less than the force required to advance them, the cylinders for one or both means may, in some embodiments, be single acting cylinders advanced hydraulically against retracting springs. Nor are the crushing bars and the delivery means necessarily restricted to the particular design shown, but may be modified by those skilled in the art without departing from the scope of the invention as set forth in the following claims.

What is claimed is:

1. In a packing and loading apparatus for refuse in which uncompressed trash is swept, by an advanced and retracted delivery means, to a sill where the trash is intermittently subjected to compression by an advanced and retracted crushing means, the hydraulic system for operating the same in successive cycles including a line from source of hydraulic fluid pressure and an exhaust line, a cylinder for operating said crushing means and a cylinder for operating said delivery means, valve means for connecting and disconnecting the admission of the hydraulic fluid to the end of the cylinder advancing the crushing means, means interconnecting said cylinders for continuous cyclic operation of said delivery means and said crushing means wherein, at one phase of each cycle, said delivery means delivers trash to said sill in time for said crushing means to advance and crush such trash including valve means to cause said delivery means to withdraw when the pressure advancing said crushing means reaches a predetermined limit and to reset the cycling means for initiation of a succeeding cycle, whereby the duration of each cycle is determined, at least in part, by the time required for the limit pressure to develop in the cylinder for the crushing means and thereby trash acted upon by said crushing means is crushed to a predetermined volume or is subjected to a predetermined crushing force, whichever is achieved sooner.

2. Apparatus as defined in claim 1 in which retraction of said crushing means and advancement of said delivery means occurs sequentially.

3. Apparatus as defined in claim 1 in which retraction of said crushing and said delivery means commences substantially simultaneously.

4. Apparatus as defined in claim 3 in which retraction of said crushing means ends before completion of the advance of said delivery means.

5. Apparatus as defined in claim 1 including means connected with said delivery means to actuate said valve means at substantially the completion of said advance of said delivery means and at substantially the completion of the retraction of said delivery means.

6. Apparatus as defined in claim 5 in which retraction of said crushing means and advancement of said delivery means occurs sequentially.

7. Apparatus as defined in claim 5 in which retraction of said crushing and said delivery means commences substantially simultaneously.

8. Apparatus as defined in claim 5 in which retraction of said crushing means ends before completion of the advance of said delivery means.

9. In a packing and loading apparatus for refuse in which uncompressed trash is swept by advanced and retracted delivery means to a sill where the trash is intermittently subjected to compression by advanced and retracted crushing means, the hydraulic system for operating the same in successive cycles including a line from a source of hydraulic fluid pressure and an exhaust line, a double-acting crusher cylinder for advancing and retracting said crushing means; a trip valve for reversibly connecting said pressure and exhaust lines to opposite ends of said crusher cylinder means, said trip valve being actuated by said delivery means when said delivery means is in its retracted position to actuate said trip valve to lead high pressure to the retraction end of said crusher cylinder and the advancing end to said exhaust line, a double-acting delivery cylinder means for advancing and retracting said delivery means, a sequence valve responsive to a predetermined increase in pressure in the retraction end of said crusher cylinder to lead high pressure to the advancing end of said delivery cylinder means, means actuated by said delivery cylinder means to trip said trip valve to direct high pressure to the advancing end of said crusher cylinder, a sequence valve responsive to a predetermined increase in pressure in the advancing end of said crusher cylinder to direct high pressure to the advancing end of said delivery cylinder means upon cessation of advance of the crusher cylinder, means to exhaust to said exhaust line hydraulic fluid expelled from the ends of said cylinders during application of high pressure to an opposite end of any such cylinder.

10. The apparatus as defined in claim 9 in which the said sequence valves respond to a pressure less than the full line pressure of said pressure line.

11. The apparatus as defined in claim 10 in which the sequence valve connected to the advancing end of said crusher cylinder responds only to pressures in excess of that required to develop the maximum force intended to be applied by said crusher to trash to be crushed thereby.

12. In a packing and loading apparatus for refuse in which uncompressed trash is swept by advanced and retracted delivery means to a sill where the trash is intermittently subjected to compression by advanced and retracted crushing means, the hydraulic system for operating the same in successive cycles including a line from a source of hydraulic fluid pressure and an exhaust line, a double-acting crusher cylinder for advancing and retracting said crushing means; a trip valve for reversibly connecting said pressure and exhaust lines to opposite ends of said crusher cylinder means, said trip valve being actuated by said delivery means when said delivery means is in its retracted position to actuate said trip valve to lead high pressure to the retraction end of said crusher cylinder means and thereby to expel fluid from the advancing end thereof, a double-acting delivery cylinder means for advancing and retracting said delivery means, means to lead said expelled fluid from said crusher cylinder means to the retraction end of said delivery cylinder, means to trip said trip valve to disconnect high pressure from the retraction end of said delivery cylinder means and direct such high pressure to the advancing end of said crusher cylinder, a sequence valve responsive to pressure in the advancing end of said crusher cylinder to direct, when advancement of said crusher cylinder stops, high pressure to the retraction end of the delivery cylinder means, and a pressure-relief valve connected to the retraction ends of said crusher cylinder and said delivery cylinder means to relieve the pressure therein when such pressure exceeds that required to retract said cylinders.

13. Apparatus defined in claim 12 in which the volume of the retraction end of said delivery cylinder means exceeds the volume of the retraction end of said crusher cylinders, whereby said crusher cylinder will be fully retracted before said delivery cylinder means is fully retracted and the volume of liquid expelled from said delivery cylinder in excess of that introduced into said crusher cylinder is discharged through said pressure relief valve.

14. In apparatus as defined in claim 13 including a check valve between said sequence valve and the retraction end of said delivery cylinder means to prevent flow from said delivery cylinder to said sequence valve and, thereby, to insure flow to said crusher cylinder and a check valve to prevent flow from said crusher cylinder to the retracting end of said delivery cylinder in order to prevent retraction of said delivery cylinder means before actuation of said sequence valve.

15. In apparatus as defined in claim 14 in which said delivery cylinder means comprises a plurality of cylinders connected in parallel and the crusher cylinder is lesser in number than the number of cylinders comprising the delivery cylinder means.

References Cited by the Examiner

UNITED STATES PATENTS

| | | | |
|---|---|---|---|
| 2,371,540 | 3/1945 | Mott | 214—83.3 |
| 2,767,867 | 10/1956 | Wood | 214—503 |
| 2,837,230 | 6/1958 | Herterich | 214—503 |
| 3,092,269 | 6/1963 | Brown et al. | 214—83.3 |

GERALD M. FORLENZA, *Primary Examiner.*

A. J. MAKAY, *Assistant Examiner.*